(12) United States Patent
Ashbrook et al.

(10) Patent No.: US 8,660,413 B2
(45) Date of Patent: Feb. 25, 2014

(54) SYSTEMS AND METHODS FOR DYNAMIC CONTENT PLAY LIST CREATION

(75) Inventors: Jeffrey R. Ashbrook, North Hollywood, CA (US); Kyle Prestenback, Los Angeles, CA (US); Evan Acosta, La Crescenta, CA (US); Brian Kwan, Pasadena, CA (US); David Jessen, Sherman Oaks, CA (US); Aaron Daly, Van Nuys, CA (US)

(73) Assignee: Disney Enterprises, Inc., Burbank, CA (US)

( * ) Notice: Subject to any disclaimer, the term of this patent is extended or adjusted under 35 U.S.C. 154(b) by 273 days.

(21) Appl. No.: 12/895,025

(22) Filed: Sep. 30, 2010

(65) Prior Publication Data

US 2012/0082439 A1 Apr. 5, 2012

(51) Int. Cl.
| | |
|---|---|
| H04N 5/783 | (2006.01) |
| H04N 5/445 | (2011.01) |
| H04N 7/173 | (2011.01) |
| H04N 9/80 | (2006.01) |
| G06F 3/00 | (2006.01) |
| G06F 3/048 | (2013.01) |
| G06F 15/16 | (2006.01) |

(52) U.S. Cl.
USPC ........... 386/344; 386/241; 709/219; 715/716; 715/719; 715/765; 715/810; 725/37; 725/61; 725/93; 725/116

(58) Field of Classification Search
USPC ......... 386/344, 241, E5.001, E9.036; 84/610, 84/645; 709/219; 715/716, 719, 765, 810; 725/37, 61, 93, 116; G9B/27.012, G9B/27.017, 27.019, 27.021, 27.05; 707/999.107, E17.102
See application file for complete search history.

(56) References Cited

U.S. PATENT DOCUMENTS

| 5,892,915 A * | 4/1999 | Duso et al. .................... 709/219 |
| 6,949,705 B2 * | 9/2005 | Furukawa ....................... 84/610 |
| 7,730,420 B1 * | 6/2010 | Miller et al. .................. 715/810 |
| 2005/0191042 A1 * | 9/2005 | Lee ................. 386/125 |
| 2006/0265421 A1 * | 11/2006 | Ranasinghe et al. ....... 707/104.1 |
| 2009/0195712 A1 * | 8/2009 | Strohmaier ................... 348/837 |

* cited by examiner

*Primary Examiner* — Thai Tran
*Assistant Examiner* — Syed Hasan
(74) *Attorney, Agent, or Firm* — Ference & Associates LLC

(57) ABSTRACT

Systems and associated methods for dynamic content play list creation are described. A fastplay application provides for dynamic play list generation, using feature categorization and local storage to present a set of custom play list(s) that are tailored to a user's preference(s). The settings may be stored locally on the media player storage device such that the preference(s) can be utilized across titles.

18 Claims, 12 Drawing Sheets

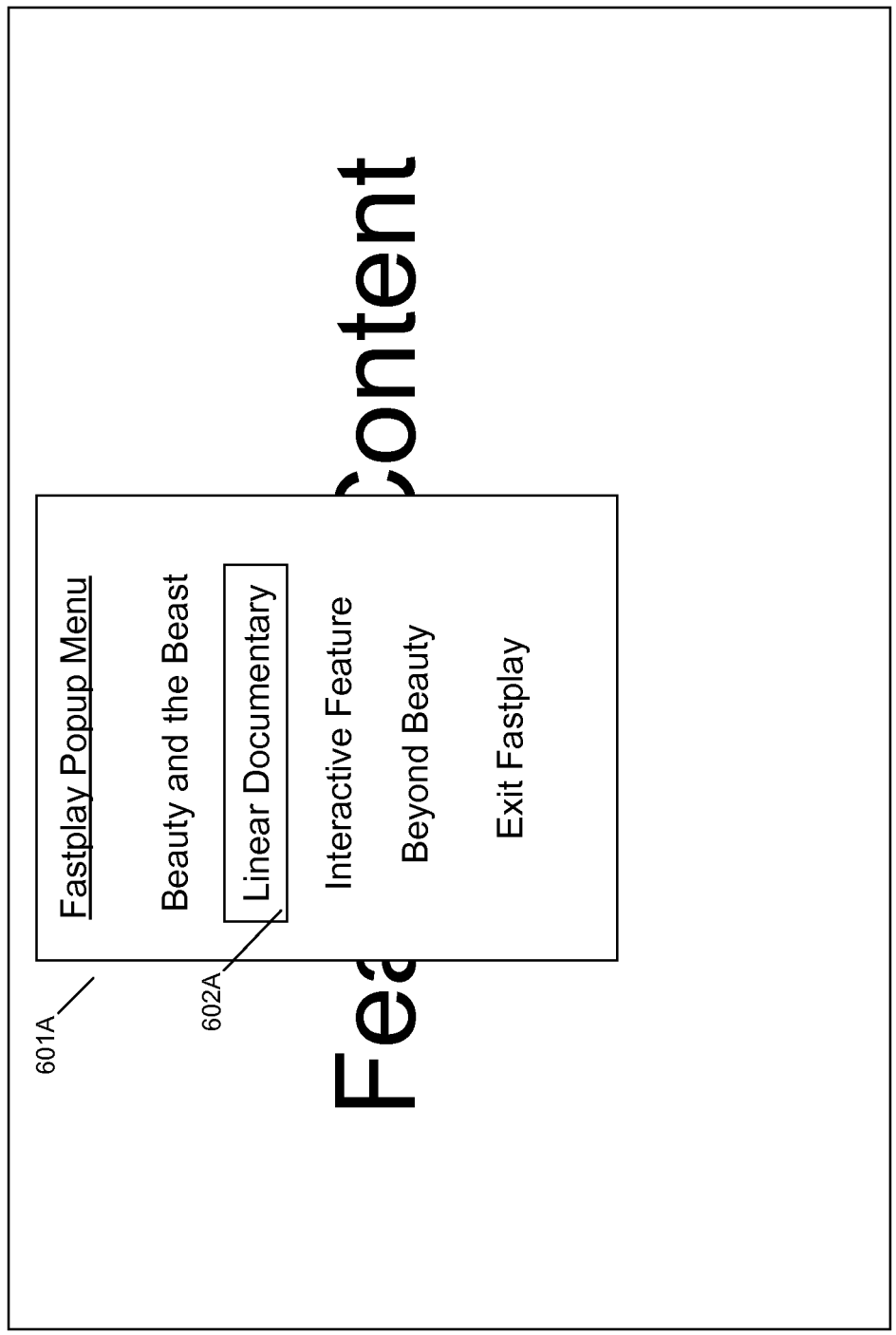

SYSTEMS AND METHODS FOR DYNAMIC CONTENT PLAY LIST CREATION

BACKGROUND

Media players, such as optical and magneto-optical disc players (DVD players or BLU-RAY DISC players), are popular for viewing audio-visual content such as movies, games and the like. Most modern players access media content stored on a multi-media disc via an optical drive. Newer formats for discs, such as the BLU-RAY DISC, provide an optical disc storage medium designed to supersede the standard DVD format and have a large storage capability, such as suitable for storing high-definition (HD) video content and other data. The BLU-RAY DISC typically provides up to 25 GB per single-layer disc, and 50 GB per dual-layer disc. These figures represent standard storage, however, and the Blu-Ray specification is open-ended. BLU-RAY DISC is a registered trademark of BLU-RAY DISC ASSOCIATION in the United States and other countries.

BRIEF SUMMARY

In summary, one aspect provides a method for dynamic content play list creation comprising: dynamically generating a fastplay play list according to one or more customizable fastplay settings; and playing media of a multi-media disc in a fastplay mode.

Another aspect provides a computer program product for dynamic content play list creation comprising: a computer readable storage medium having computer readable program code embodied therewith, the computer readable program code comprising: computer readable program code configured to dynamically generate a fastplay play list according to one or more customizable fastplay settings; and computer readable program code configured to play media of a multi-media disc in a fastplay mode.

A further aspect provides a system for dynamic content play list creation comprising: one or more processors; and a memory operatively connected to the one or more processors; wherein, responsive to execution of computer readable program code accessible to the one or more processors, the one or more processors are configured to: dynamically generate a fastplay play list according to one or more customizable fastplay settings; and play media of a multi-media disc in a fastplay mode.

The foregoing is a summary. For a better understanding of example embodiments, together with other and further features and advantages thereof, reference is made to the following description, taken in conjunction with the accompanying drawings, and the scope of the invention will be pointed out in the appended claims.

DETAILED DESCRIPTION

Figure 1:
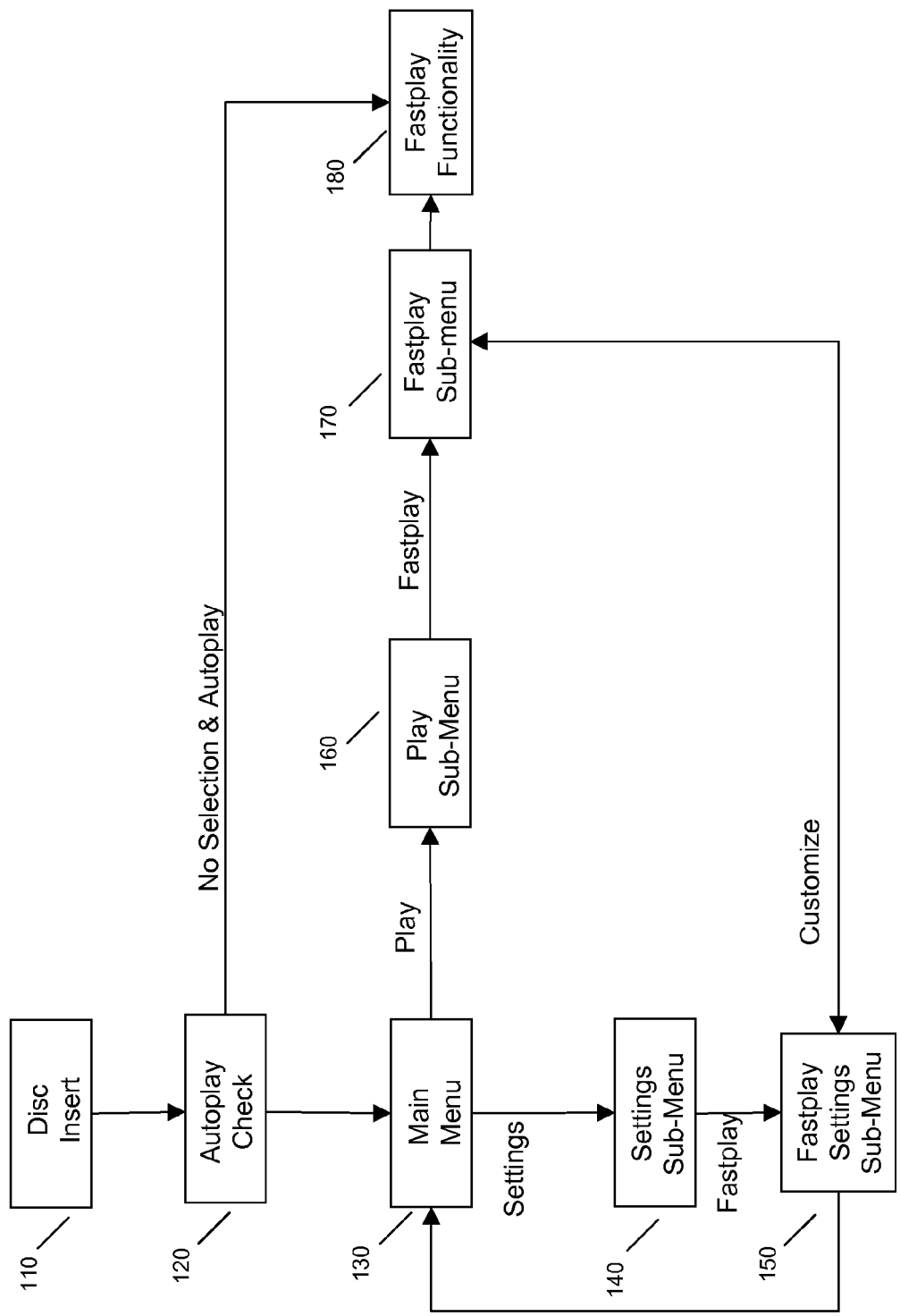
FIG. 1 illustrates an example flow for a fastplay application.

Components of the embodiments, as generally described and illustrated in the figures herein, may be arranged and designed in a wide variety of different configurations in addition to the described example embodiments. Thus, the following more detailed description of example embodiments, as represented in the figures, is not intended to limit the scope of the invention, as claimed, but is merely representative of example embodiments. Furthermore, the described features, structures, or characteristics may be combined in any suitable manner in one or more embodiments.

Reference throughout this specification to embodiment(s) means that a particular feature, structure, or characteristic described in connection with the embodiment is included in at least one embodiment. Thus, appearances of the phrases "certain embodiments" or "example embodiment" or the like in various places throughout this specification are not necessarily all referring to the same embodiment.

Some useful information regarding autoplay/fastplay applications is provided by co-pending and commonly assigned U.S. patent application Ser. No. 10/757,089, entitled "FAST PLAY DVD", filed on Jan. 13, 2004, incorporated by reference here. Some useful information regarding managing settings across titles is provided by co-pending and commonly assigned U.S. patent application Ser. No. 12/895,144, entitled "SYSTEMS AND METHODS FOR SETTINGS MANAGEMENT ACROSS MULTIPLE TITLES", filed concurrently herewith, incorporated by reference here.

At the outset, the following terms are given the following meanings herein. Application refers to a program module or executable program having computer readable program code configured to achieve a stated function. An option/setting refers to a given characteristic of an application, which may be chosen from among a variety of characteristics. An application, for example a JAVA application, is loaded by the media player to perform the stated functionality. Applications can be stored in a variety of locations, including on a multi-media disc, on a local storage device of the media player (hard drive or binding unit), on a remote device, or any suitable combination of the foregoing.

In DVD, a technology referred to as fastplay (also referred to herein as autoplay) gives a DVD consumer the ability to view a set of content (play list) on the disc in a fashion similar to viewing content on VHS, that is, linearly. Moreover, in DVD, fastplay can be utilized automatically, without having to interface with a menu. Currently, using fastplay, the content is not extensively customizable, as the content is presented to consumers without permitting the user to modify fastplay content, for example based on available time and/or content preference. For example, if the user does not want to experience a particular offering in a fastplay application play list, the user is forced to view the particular offering regardless of his or her preference. Moreover, once a user inputs his or her preferences, it would be desirable for these preferences to be retained and applied across titles.

Accordingly, embodiments provide systems and associated methods configured for dynamic content play list creation. The dynamic content play list creation is described in connection with a fastplay application for BLU-RAY DISCs; however, this is by no means limiting, as other media storage devices/discs can be utilized using the general principles described herein.

Embodiments utilize categorization and local media player storage to present a set of custom play list(s) that are tailored to a user's choices and/or available time. The settings associated with the play list thus created are stored locally on the media player storage device (also referred to herein as a hard drive or a binding unit) such that the preferences can be utilized across all titles enabled with settings management technology. Dynamic content play list creation allows the user to customize the viewing experience by offering a user interface to set available time and content preferences.

The description now turns to the figures. The illustrated example embodiments will be best understood by reference to the figures. The following description is intended only by way of example and simply illustrates certain embodiments representative of the invention, as claimed.

Referring to FIG. 1, an example flow for a fastplay application is illustrated. On multi-media disc ("disc") insert 110, such as a BLU-RAY DISC, an application completes an autoplay check 120. The autoplay check 120 includes determining if the disc that has been inserted supports fastplay (that is, determining if the disc has a fastplay application installed). The media player also waits a predetermined time in order for the user to provide a selection (for example, a menu selection) if automatic starting of fastplay is not desired. If no selection is received and the disc supports fastplay, a fastplay functionality can be implemented automatically 180. This includes for example starting the fastplay application. As described further herein, the fastplay application includes automatically playing a predefined content list. Moreover, if the disc is autoplay enabled and the user has previously used autoplay, preferred settings saved locally to a media player storage device can be automatically applied to this autoplay session. If the user has no previously saved autoplay settings, the system can redirect the disc to a fastplay setting sub-menu or automatically apply default fastplay settings, as further described herein.

It will be readily understood by those having ordinary skill in the art that if the disc is not autoplay enabled, the disc can be handled as a normal disc, that is, without enabling any of the fastplay related menus and modules. Thus, further description of a disc that fails the autoplay check will be omitted, and the remainder of the description focuses on autoplay enabled discs.

If there is a user selection made at 120, for example an input on a remote control device of the media play for the main menu, the media player displays the appropriate media display corresponding to the selection. Assuming for example the user selected the main menu button on the remote control, the main menu is displayed 130 on the screen (for example, HD television screen). The main menu comprises a user interface derived from an application, which can be stored for example on the disc.

Responsive to a user selection on the main menu, the media player presents an appropriate media display corresponding to the selection. For example, the user may select a settings selection, which brings up a settings sub-menu that contains a fastplay settings selection 140. Responsive to selection of fastplay settings from the settings sub-menu, a fastplay settings sub-menu is displayed 150. From the fastplay settings sub-menu, the user can configure/customize the fastplay application settings, as further described herein, prior to implementing or continuing with a fastplay functionality session 180.

Alternatively, the user may select play from the main menu, in which case a play sub-menu is displayed 160. The play sub-menu allows for various selections, including a fastplay play selection to bring up a fastplay sub-menu 170. The fastplay sub-menu provides selections for beginning fast play functionality 180 and for customizing fastplay settings. A customize selection from the fastplay sub-menu brings up the fastplay settings sub-menu 150.

Figure 2:
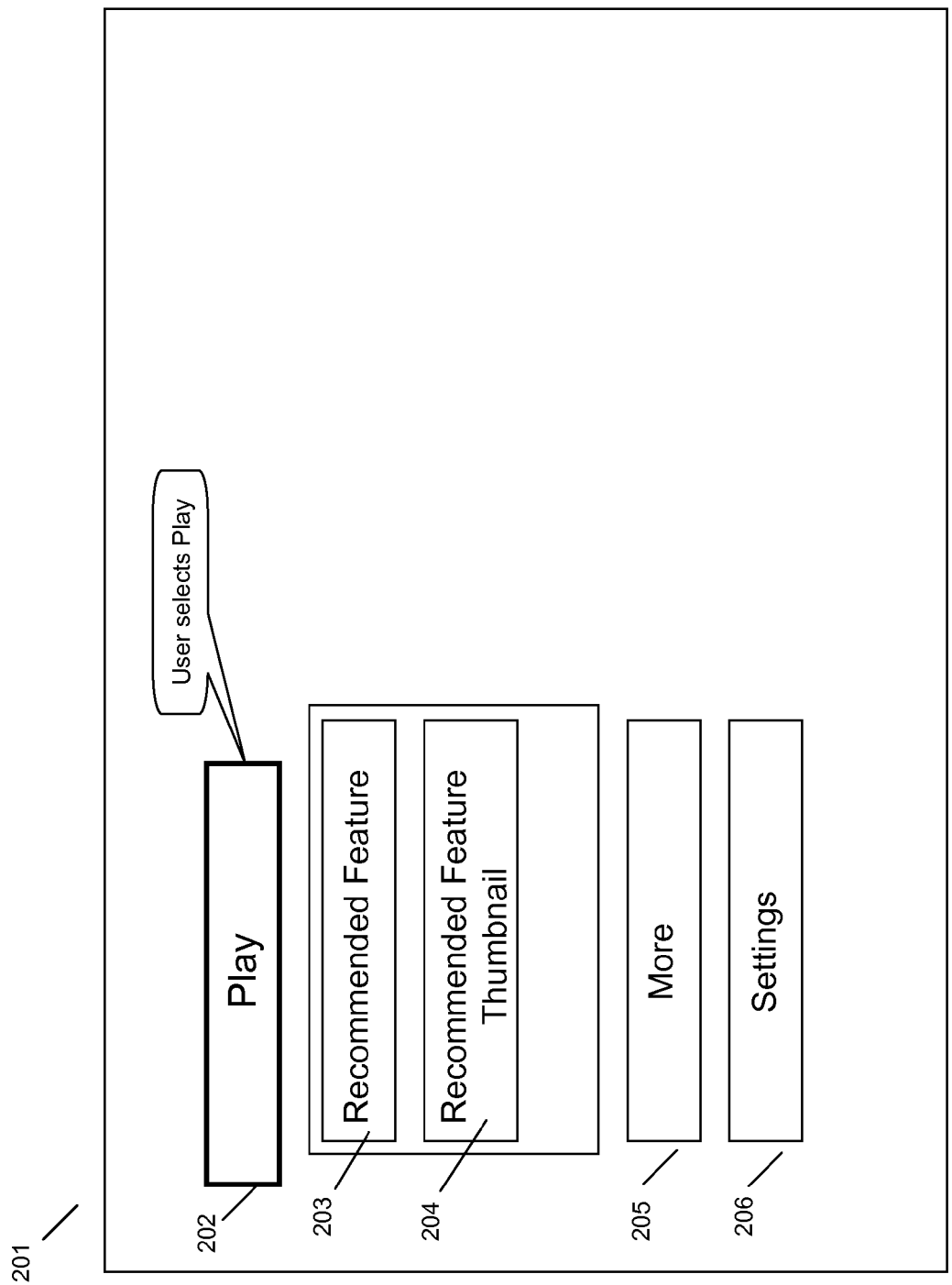
FIG. 2 illustrates an example main menu.

FIG. 2 illustrates a main menu 201. The main menu 201 provides several selections including for example play 202, recommended feature 203 (which may include a recommended feature thumbnail 204), more 205 (which may include bonus features such as audio commentary, documentary and the like), and settings 206. More information on the recommended feature and recommended feature thumbnail is contained in co-pending and commonly assigned U.S. patent application Ser. No. 12/895,122, entitled "SYSTEMS AND METHODS FOR INCENTIVIZING CONTENT ENGAGEMENT", filed concurrently herewith, incorporated by reference here. Selection of settings 206 corresponds to selection of settings at main menu 130, which brings up a setting sub-menu.

Figure 3:
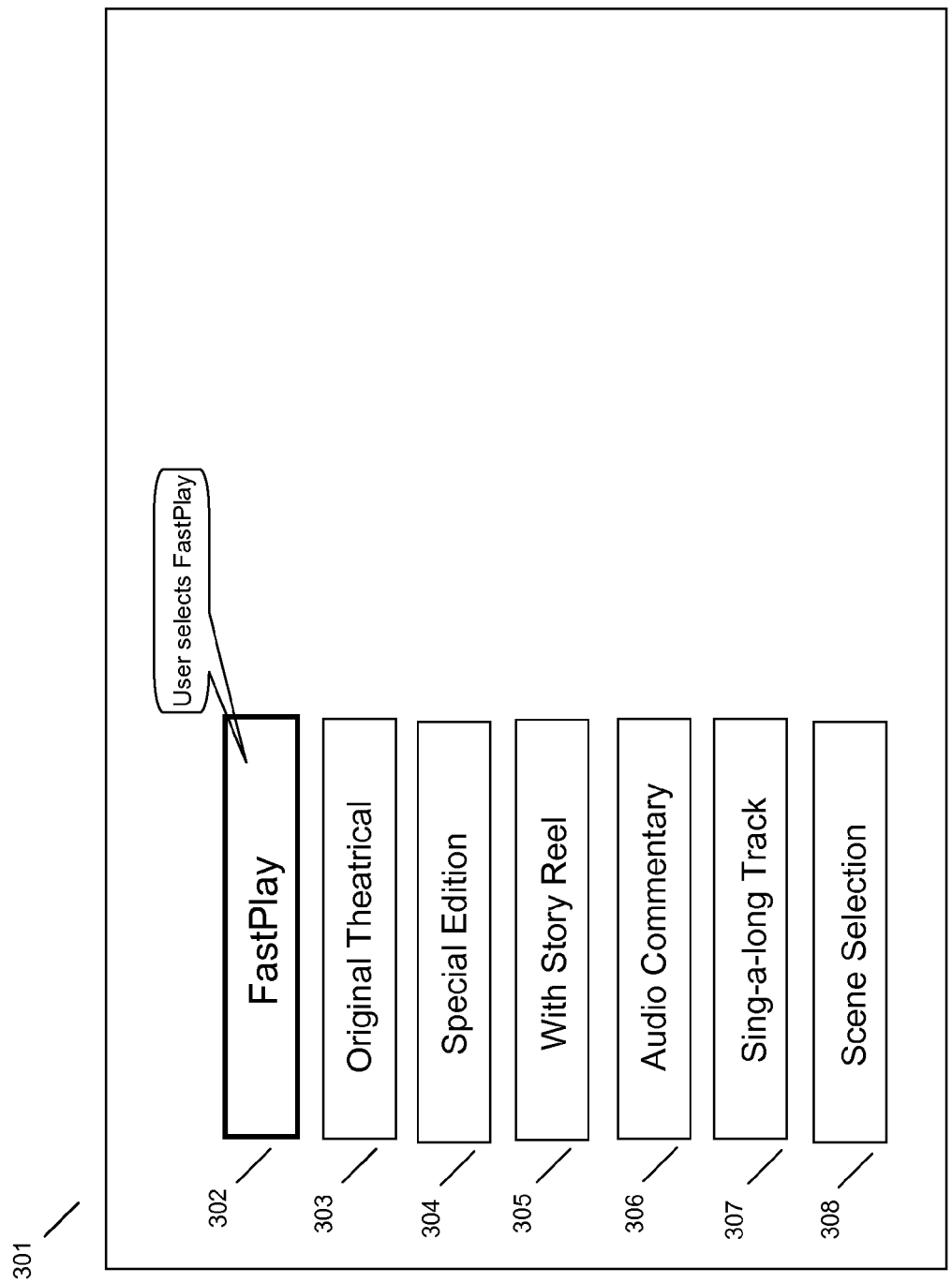
FIG. 3 illustrates an example play sub-menu.

Assuming the user selects play from the main menu 201, a play sub-menu will be displayed by the media player. Selection of play on main menu 201 corresponds to selection of play at 130. Referring to FIG. 3, the play sub-menu 301 includes a variety of selections including fastplay 302, original theatrical 303, special edition 304, with story reel 305, audio commentary 306, sing-a-long 307, and scene selection 308. Assuming the user selects fastplay 302 from the play sub-menu 201, a fastplay sub-menu is displayed. Selection of fastplay from the play sub-menu 301 corresponds to selection of fastplay at 160.

Figure 4:
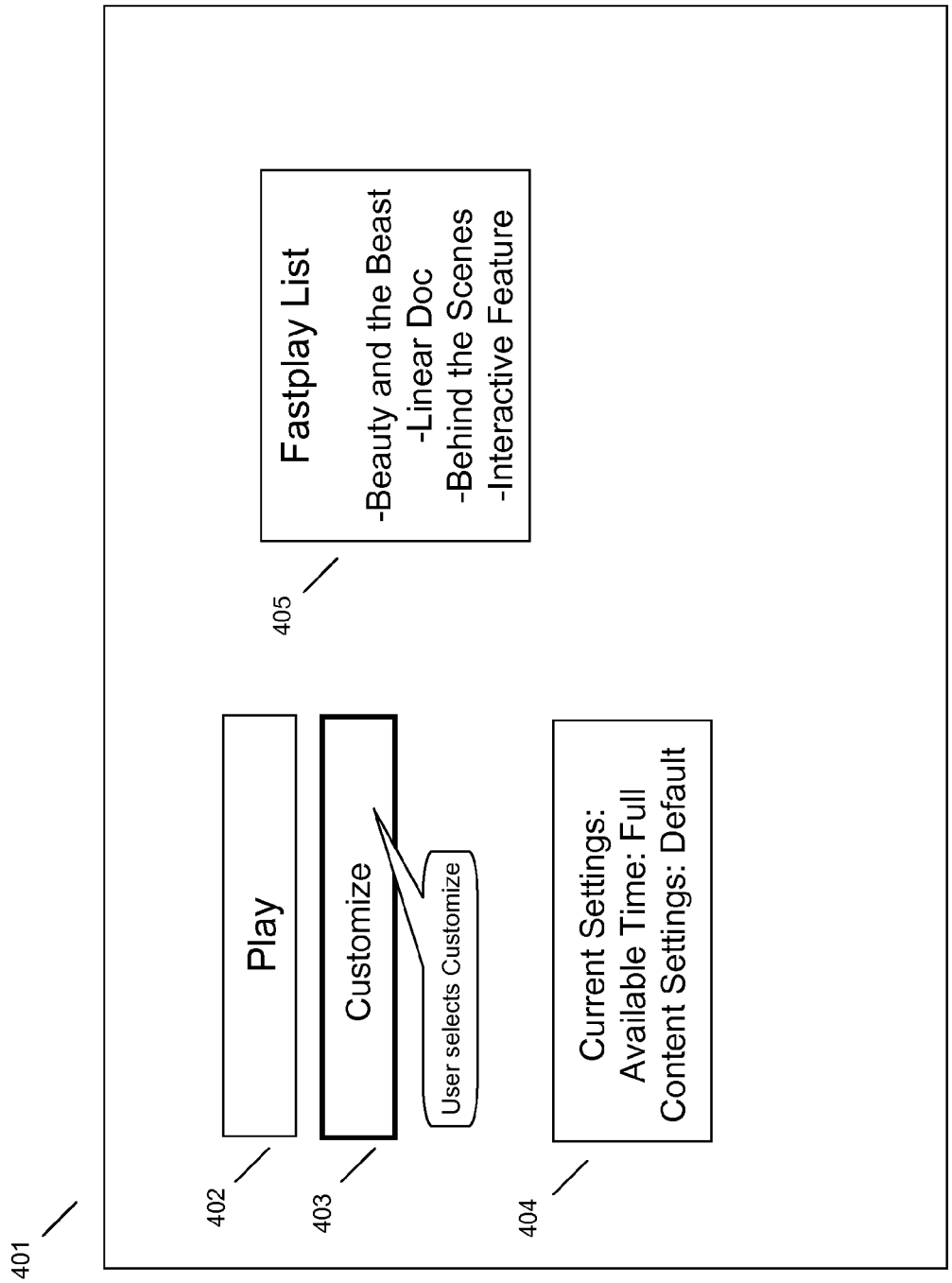
FIG. 4 illustrates an example fastplay sub-menu.

Responsive to selection of fastplay from the play sub-menu 301, a fastplay sub-menu is displayed. FIG. 4 illustrates an example fastplay sub-menu 401. The fastplay sub-menu 401 includes several selections, for example play 402 and customize 403. The fastplay sub-menu 401 may also include other displays, for example current settings 404 and a fastplay list 405. Selection of play 402 implements fastplay functionality 180. Selection of customize 403 brings up a fastplay settings sub-menu. The current settings 404 displays the current settings for fast play. In FIG. 4 for example, the current settings 404 are listed as Available Time: Full; Content Settings: Default. The fastplay list 405 displays the current content included in the fastplay application play list, that is, the content that will be played if the user selects play 402 given the current fastplay settings. Selection of customize corresponds to a selection of customize at 170 of FIG. 1.

Assuming the user selects customize 402, a fastplay setting sub-menu is displayed. The same fast play settings sub-menu may be obtained via selecting settings on the main menu and selecting fastplay from the setting sub-menu, as illustrated in FIG. 1.

Figure 5A:
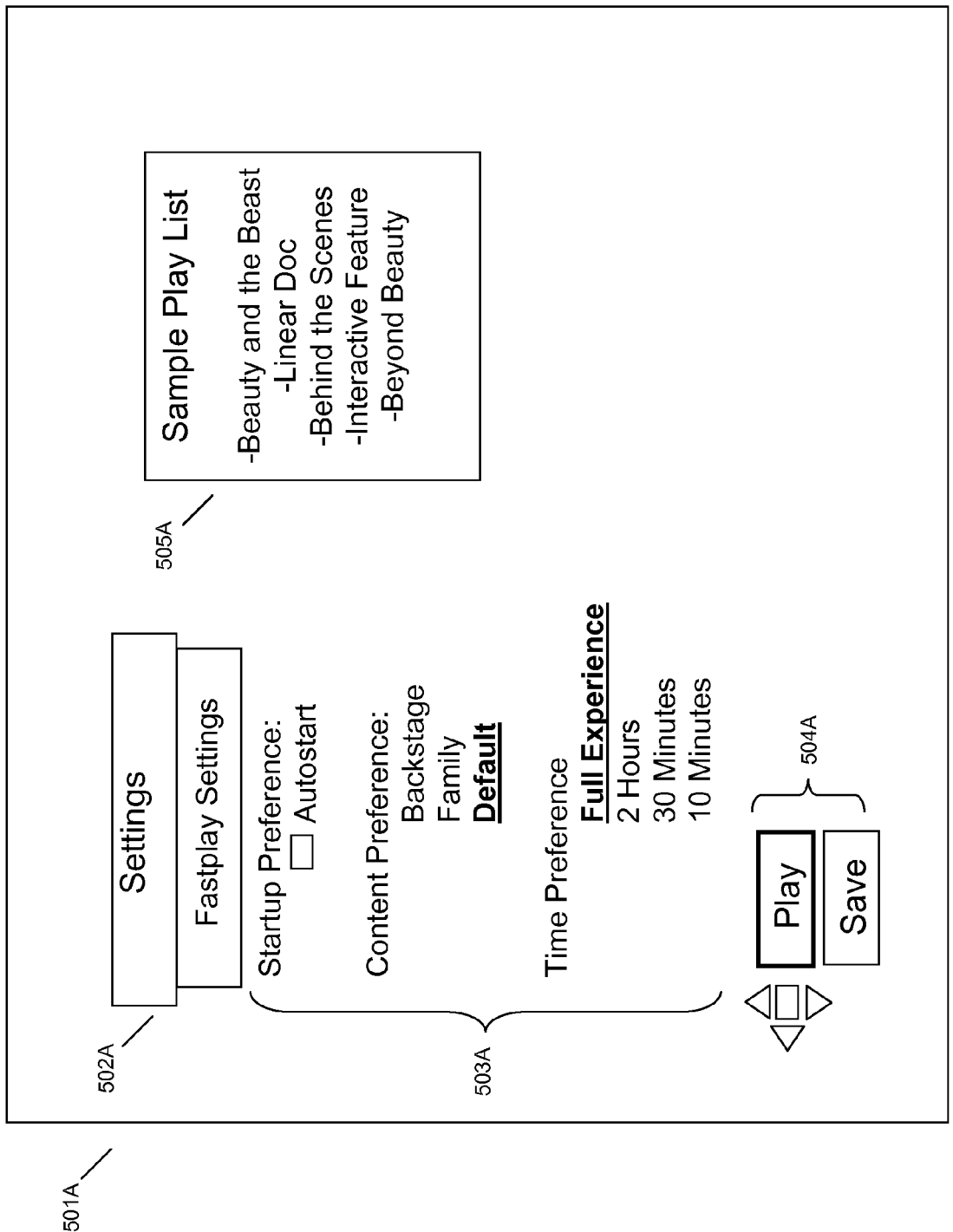
FIG. 5(A-B) illustrate example fastplay settings sub-menus.

FIG. 5(A-B) illustrate two example fastplay settings sub-menus. Referring to FIG. 5A, a fastplay settings sub-menu 501A includes a user interface menu that permits a user to customize the fastplay application settings. The fastplay application settings 503A appear below a settings header display 502A and include for example an auto-start preference, which determines if the fastplay option should automatically start responsive to disc insert. The user can toggle the auto-start feature on and off.

Additionally, fastplay application settings 503A include content preference and time preference. The content preference settings list options for the user to customize which types of content the user prefers. The example illustrated in FIG. 5A includes settings corresponding to Backstage, Family and Default. The Default setting is illustrated as highlighted, corresponding to a user preference that whatever predefined fastplay content the producers of the disc have selected is preferred for fastplay playback. The Default setting for example can correspond to a predefined play list for each time constraint.

The time preference settings include options for the user to customize how much time the user intends to spend interacting with (for example, viewing) the disc. The example time preferences illustrated in FIG. 5A include Full Experience, 2 Hours, 30 Minutes, and 10 Minutes. In FIG. 5A, Full Experience is highlighted, corresponding to a user preference for no time limitations to be imposed in compiling the fastplay content play list.

The fastplay settings sub-menu 501A further includes a play selections 504A for playing the fastplay application and for saving any changes to the fastplay application settings, for example in media player storage (binding unit or hard drive). The saved fastplay application settings can be accessed across titles, as with other saved application settings. In FIG. 5A, the play selection is highlighted, corresponding to an indication that the user has reviewed the fastplay application settings and has chosen to start fastplay. The fastplay settings sub-menu further includes a sample play list 505A such that the user is aware of which content will be included in the fastplay experience given the current fastplay application settings. Customization of the fastplay application settings may dynamically change this play list, as further described herein.

Figure 5B:
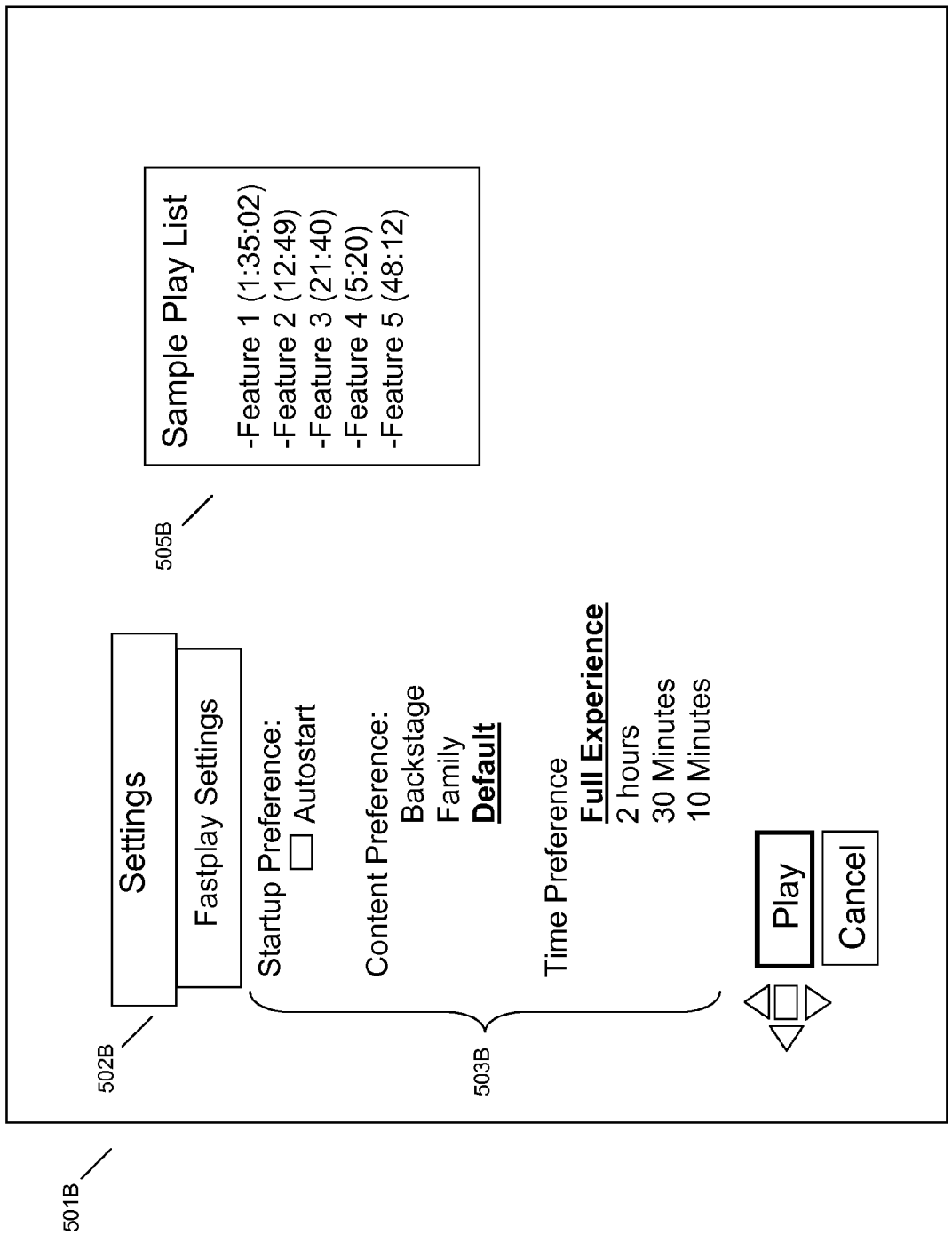

Referring to FIG. 5B, another example fastplay settings sub-menu is illustrated. Here, the fastplay setting sub-menu 501B includes settings header 502B, fastplay application settings 503B include content preference and time preference. Given that the fastplay application settings 503B indicate Default and Full Experience, the fastplay application compiles a play list 505B that matches these settings. The fastplay application will dynamically update the fastplay play list 503B if the user changes any of the customizable settings. For example, the sample play list 503B includes Features 1-5, which are listed along with their running times. Since the Full Experience option has been selected, time constraints do not need to limit the features available, and the features will be selected solely on content descriptors. However, if the user were to customize fastplay such that a time constraint is imposed, for example, 30-minute, the fastplay application would dynamically update the sample play list 503B. For example, given a 30-minute time constraint, Features 1 and 5 would not be included because their running times exceed this time constraint. Rather, the fastplay application would dynamically compile an alternative play list of not greater than 30 minutes running time and display it for user review and approval. It is of course possible to allow the user to rearrange item ordering in the fastplay play list once the list is compiled.

Referring to FIG. 6(A-B), once the user reviews and approves the fastplay settings, the user may select play and begin fastplay. It will be readily understood that fastplay can be configured to begin playing content from the play list responsive to a predetermined time out or the like, rather than requiring the user to select play. Referring to FIG. 6A, during play of the fastplay play list, the user can bring up a fastplay popup menu 601A in order to quickly determine where he or she is in terms of the fastplay play list. The example illustrated in FIG. 6A shows that the user has progressed to viewing the second feature 602A in the play list, that is, Linear Documentary.

Figure 6B:
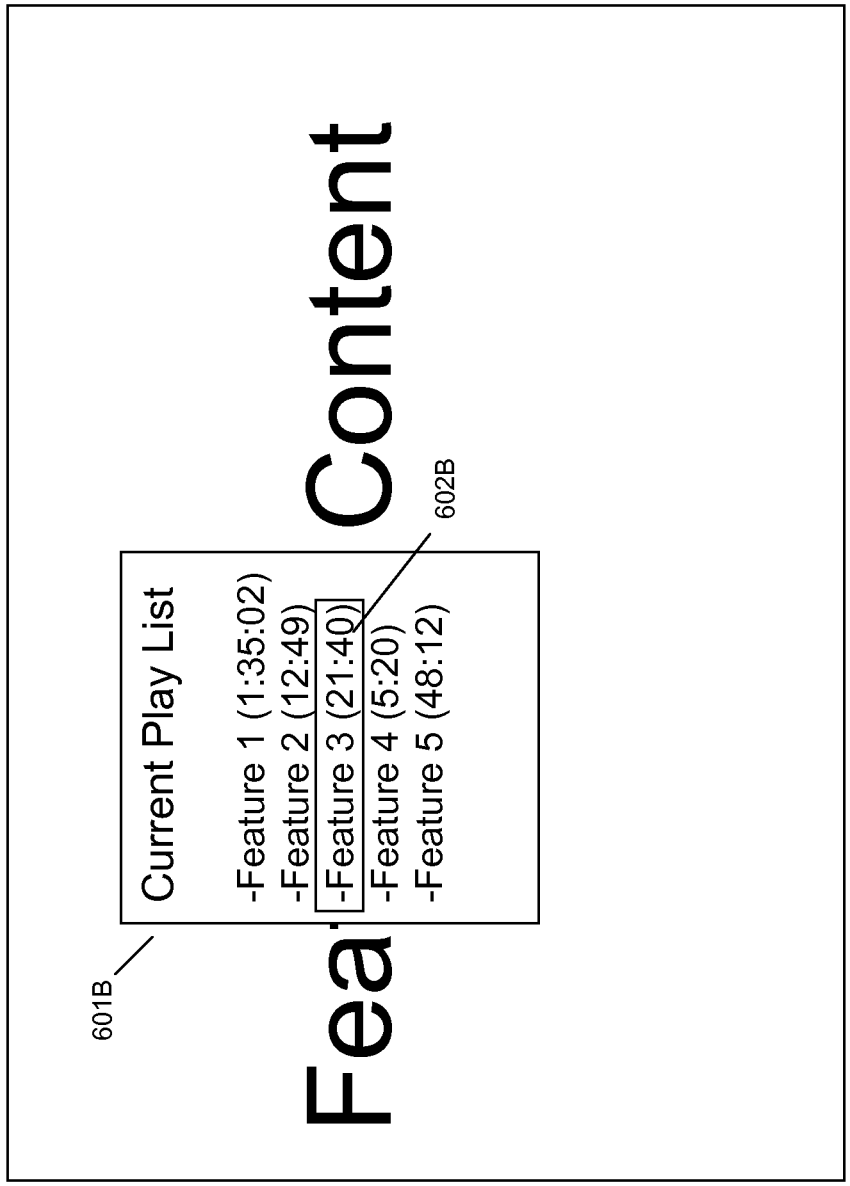
FIG. 6(A-B) illustrate example fastplay popup menus.

Referring to FIG. 6B, the fastplay popup menu 601B can be used to navigate to other features in the fastplay play list. For example, the user can simply scroll to the desired feature and select it to navigate to the feature. The example illustrated in FIG. 6B shows that the user wishes to navigate to Feature 3

602B. Note that a variety of displays can be utilized. The fastplay popup menu 601B illustrated in FIG. 6B lists the features along with their running times.

Figure 7:
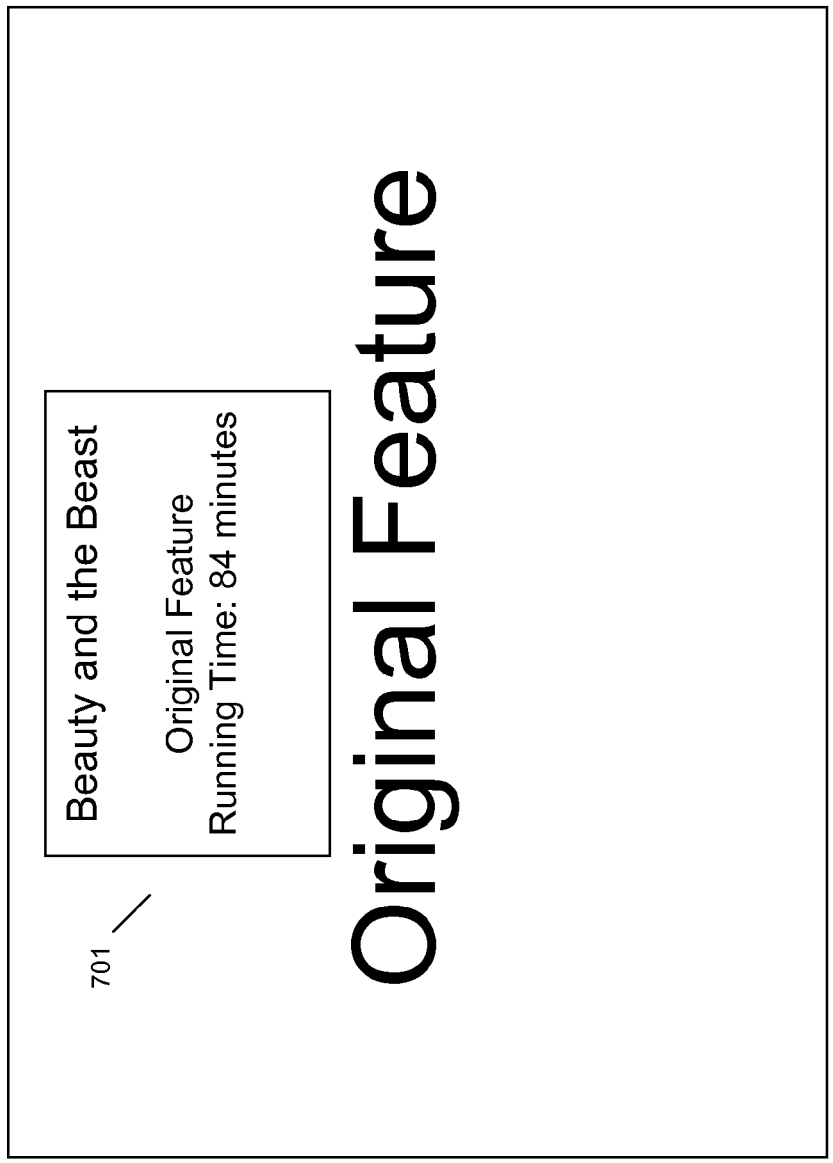
FIG. 7 illustrates an example card.

Referring to FIG. 7, while watching a feature in fastplay, a card 701 can optionally be displayed, for example at the start of each feature or segment of content. This allows the user to readily ascertain which one of the features is beginning and therefore where in the play list the user is. The card 701 can contain a variety of information, as for example illustrated in FIG. 7 the name of the feature (Beauty and the Beast), a descriptor of the feature (Original Feature), and the running time (84 minutes).

Figure 8:
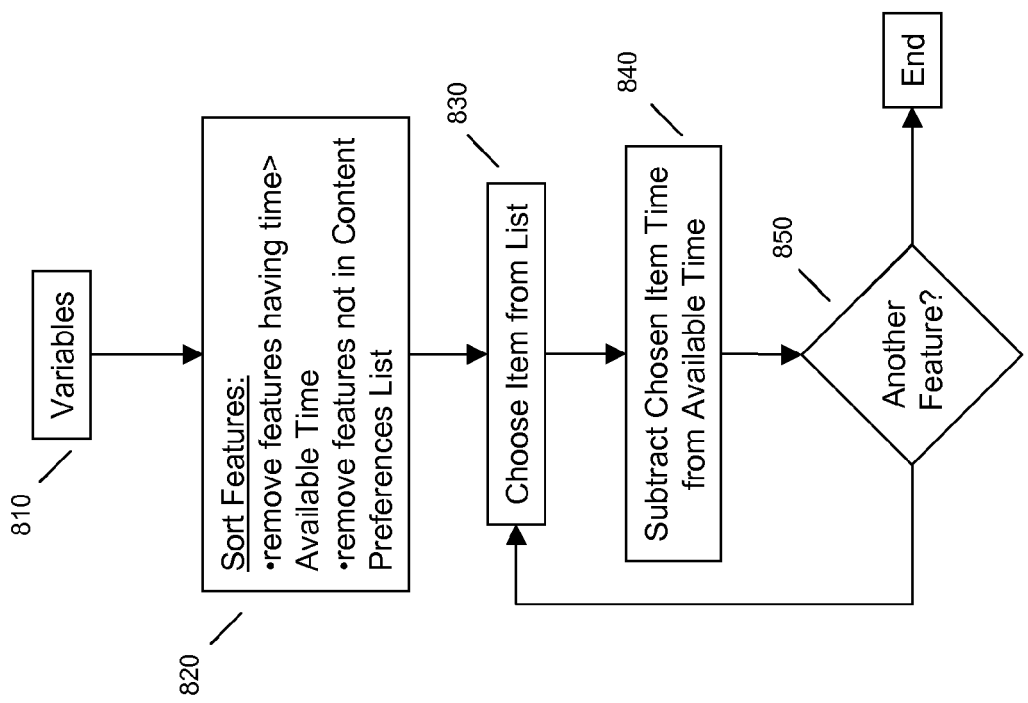
FIG. 8 illustrates an example of fastplay play list creation.

Referring to FIG. 8, an example of dynamic play list generation is illustrated. Variables are accessed 810 by the fastplay application. The variables correspond to fastplay application settings, which can be stored locally on the media player storage device. As described herein, these variables are customizable. Any existing variables can be changed by the user, for example via accessing the fastplay settings sub-menu and changing one or more customizable settings. The variables used as non-limiting examples in this description are available time/time preference and content preference.

Given the variables, the fastplay application sorts the features 820 available on the disc such that a play list can be generated within the confines of the variables. In order for the fastplay application to create dynamic play lists, it must be supplied with the appropriate meta data regarding the available features of the disc (or the set of discs if a multi-disc set), for example "category type" and "runtime" of each feature. If the feature is not purely video and contains interactivity, the feature can either be reserved exclusively for the "Full Experience" play list or the "runtime" can be estimated (for example, by empirically solving for the average playback time). The example below shows how content could be categorized.

```
<Features>
    <Feature id='1'>
        <category>Backstage</category>
        <runtime>13:54</runtime>
    </Feature>
    ...
    ...
    <Feature id='n'>
        <category>Family</category>
        <runtime>45:01</runtime>
    </Feature>
</Features>
```

The fastplay application sorts the features according to the variables, for example running time, and removes features having a running time greater than the indicated running time variable. Likewise, the fastplay application removes features from the play list that have content descriptors not matching the indicated content preferences of the variables. Given the list of available features for inclusion in the play list, the fastplay application chooses an item from the list 830 for inclusion in the fastplay play list. This can be accomplished in a variety of ways. For example, if the features have been sorted according to running times, the fastplay application can simply choose the first feature in the running-time ordered list as the first included feature in the fastplay play list.

Once a feature has been chosen, the fastplay application subtracts its running time 840 from the available running time indicated in the time preference variable. The fastplay play list now includes one feature. The process iterates 850 until no remaining feature can be chosen without violating the time preference variable. Once the fastplay play list has been populated, the process ends and the play list has been generated. It should be noted that at any point in the process, an error card and explanation might be displayed. If the generation of a fastplay play list is not possible, an error card displaying an explanation is appropriate. For example, if only the feature and bonus materials are available as features on a given disc, and each is in excess of 30 minutes, and the user stored fastplay customization settings indicate a time variable of 30 minutes, the fastplay application could not select a feature for inclusion and should indicate this to the user.

As an alternative to using the automatic play list generation, as described in connection with FIG. 8, the available play lists may be specifically pre-defined for each category and time combination. When done this way, the play lists should follow the order defined in the order specification.

Figure 9:
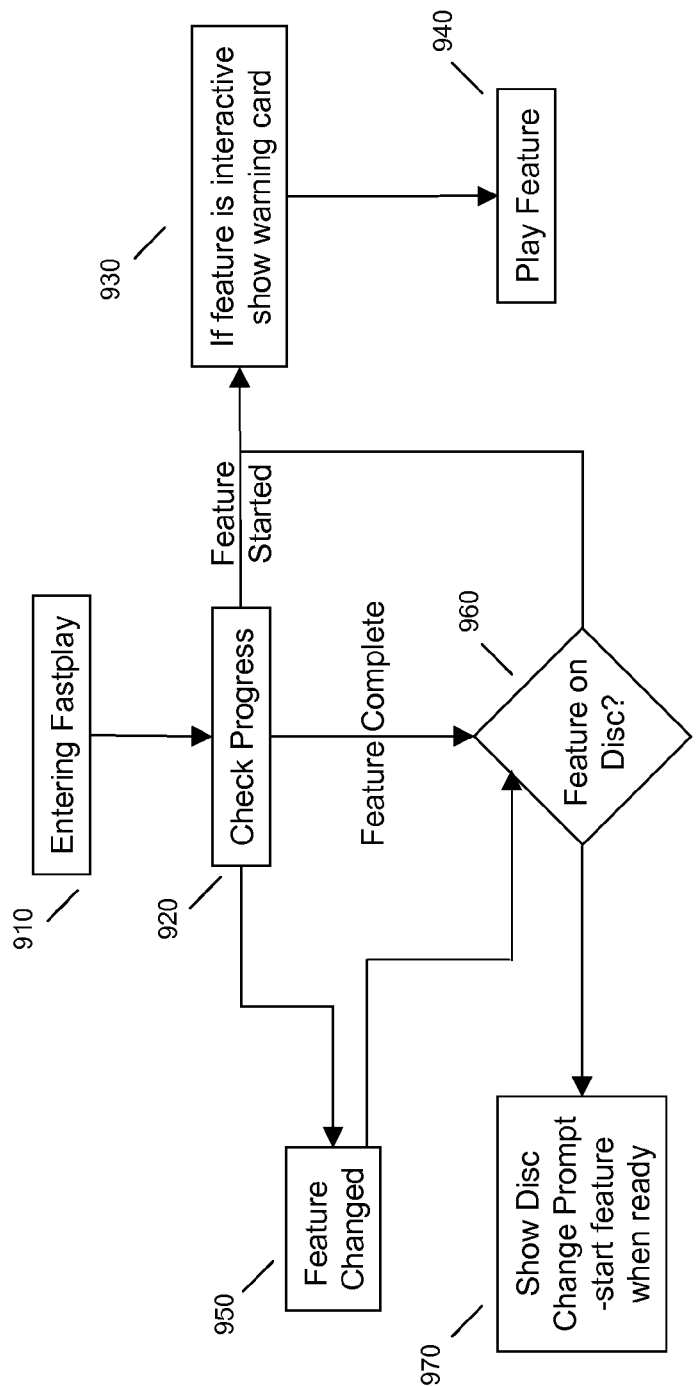
FIG. 9 illustrates an example of running fastplay application operation.

Referring to FIG. 9, an example of fastplay application operation is illustrated. When fastplay has been entered 910, the fastplay application checks the progress 920 to determine the next step. For example, if a feature has been started at 920, it is ascertained if the first feature to be played is an interactive feature, and if so, a warning card may be displayed 930 prior to beginning an interactive feature, informing the user that some user interactivity will be required to progress through the interactive feature. The warning card could be in the form of a menu prompt, wherein if the user does not interact with the menu prompt, the interactive feature is skipped and the next feature in the play list is begun. Responsive to clearing of the warning card, if one is displayed, the feature is played 940.

If the progress check 920 indicates that a feature has been changed 950, as via a user interacting with the fastplay popup menu, the fastplay application checks if the feature is on the disc 960. The fastplay application may include features in a disc unbound way, that is, may include features in the fastplay play list from different discs in a multi-volume/disc set. If the feature to be played resides on another disc, a disc change prompt is displayed 970. If the new feature is on the same disc, the fastplay application can again determine if the new feature is an interactive feature 930 prior to playing the feature 940.

Figure 10:
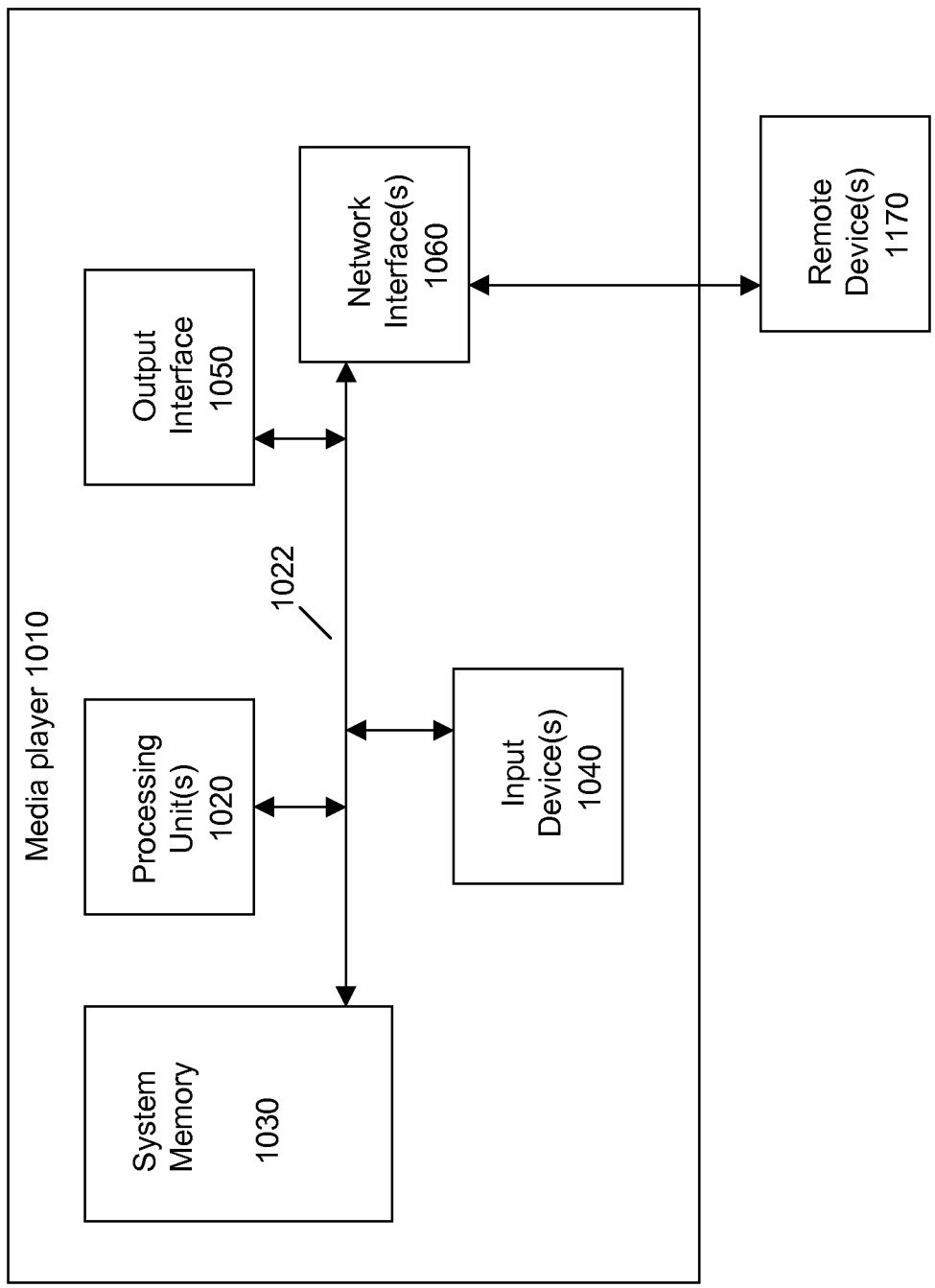
FIG. 10 illustrates an example media player.

Referring to FIG. 10, it will be readily understood that embodiments can be implemented using any of a wide variety of devices or combinations of devices. An example device that may be used in implementing one or more embodiments includes a computing device in the form of a media player 1010, such as a BLU-RAY DISC player. In this regard, the media player 1010 may execute program instructions configured to manage application settings and perform other functionality of the embodiments, as described herein.

Components of media player 1010 may include, but are not limited to, processing units 1020, a system memory 1030, and a system bus 1022 that couples various system components including the system memory 1030 to the processing unit 1020. Media player 1010 may include or have access to a variety of computer readable media such as stored in system memory and/or on a multi-media disc. The system memory 1030 may include computer readable storage media in the form of volatile and/or nonvolatile memory such as read only memory (ROM) and/or random access memory (RAM), and/or a binding unit/hard drive. By way of example, and not limitation, system memory 1030 may also include an operating system, application programs, other program modules, and program data.

A user can interface with (for example, enter commands and information) the media player 1010 through input devices 1040, which can include remote input devices. A monitor, HD television set, or other type of display device can also be connected to the system bus 1022 via an interface, such as an output interface 1050. In addition to a monitor, media players may also include other peripheral output devices. The media player 1010 may operate in a networked or distributed environment using logical connections to one or more other remote computers or databases. The logical connections may include a network, such local area network (LAN) or a wide area network (WAN), but may also include other networks/buses.

It should be noted as well that embodiments may be implemented as a system, method or computer program product. Accordingly, aspects of the invention may take the form of an entirely hardware embodiment, an entirely software embodiment (including firmware, resident software, micro-code, et cetera) or an embodiment combining software and hardware aspects. Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative embodiments have been described herein with reference to the accompanying drawings, it is to be understood that the embodiments are not limited to those precise embodiments, and that various other changes and modifications may be affected therein by one skilled in the art without departing from the scope or spirit of the disclosure.

What is claimed is:

1. A method for dynamic content play list creation comprising:
 dynamically generating a fastplay play list according to one or more customizable fastplay settings;
 playing media of a multi-media disc in a fastplay mode according to a default fastplay play list;
 wherein the fastplay mode comprises an automated viewing mode in which a plurality of features of the multimedia disc are presented at standard playing speed and in a predetermined linear order automatically on multimedia disc insertion and without user interaction;

providing a menu option for customizing one or more fastplay settings; and responsive to user input customizing the one or more fastplay settings, dynamically updating the default fastplay play list according to the one or more customized fastplay settings;

the customized fastplay settings altering the predetermined linear order of multi-media disc content played automatically on multi-media disc insertion.

2. The method according to claim 1, further comprising determining if the multi-media disc supports the fastplay mode.

3. The method according to claim 1, wherein dynamically updating the default fastplay play list according to one or more customized fastplay settings further comprises:

accessing one or more new fastplay settings; and selecting features from an available features list of the multi-media disc according to the one or more new fastplay settings.

4. The method according to claim 3, wherein dynamically updating the default fastplay play list according to one or more customized fastplay settings further comprises:

sorting the plurality of features according to running time; and selecting features according to running time based on an available time setting.

5. The method according to claim 4, wherein dynamically updating the default fastplay play list according to one or more customized fastplay settings further comprises:

selecting features according to a preferred content setting.

6. The method according to claim 1, wherein the one or more fastplay settings comprise available time and content preference.

7. The method according to claim 1, further comprising:

determining if a feature in the fastplay play list is an interactive feature; and displaying a warning card regarding the interactive nature of the interactive feature.

8. The method according to claim 1, further comprising:

determining if a feature in the fastplay play list is on the multi-media disc; and responsive to determining that the feature is not on the multi-media disc, displaying a change disc prompt.

9. The method according to claim 1, further comprising, responsive to receiving user input customizing one or more fastplay settings, saving the one or more customized fastplay settings in media player local memory.

10. A computer program product for dynamic content play list creation comprising:

a non-transitory computer readable storage medium having computer readable program code embodied therewith, the computer readable program code comprising:

computer readable program code configured to dynamically generate a fastplay play list according to one or more customizable fastplay settings;

computer readable program code configured to play media of a multi-media disc in a fastplay mode according to a default fastplay play list;

wherein the fastplay mode comprises an automated viewing mode in which a plurality of features of the multimedia disc are presented at standard playing speed and in a predetermined linear order automatically on multimedia disc insertion and without user interaction;

computer readable program code configured to provide a menu option for customizing the one or more fastplay settings; and computer readable program code configured to, responsive to user input customizing the one or more fastplay settings, dynamically update the default fastplay play list according to the one or more customized fastplay settings;

the customized fastplay settings altering the predetermined linear order of multi-media disc content played automatically on multi-media disc insertion.

11. The computer program product according to claim 10, further comprising computer readable program code configured to determine if the multi-media disc supports the fastplay mode.

12. The computer program product according to claim 10, wherein to dynamically update the default fastplay play list according to one or more customized fastplay settings further comprises:

accessing one or more new fastplay settings; and selecting features from an available features list of the multi-media disc according to the one or more new fastplay settings.

13. The computer program product according to claim 12, wherein to dynamically update the default fastplay play list according to one or more customized fastplay settings further comprises:

sorting the plurality of features according to running time; and selecting features according to running time based on an available time setting.

14. The computer program product according to claim 13, wherein to dynamically update the default fastplay play list according to one or more customized fastplay settings further comprises:

selecting features according to a preferred content setting.

15. The computer program product according to claim 10, wherein the one or more fastplay settings comprise available time and content preference.

16. The computer program product according to claim 10, further comprising:

computer readable program code configured to determine if a feature in the fastplay play list is an interactive feature; and computer readable program code configured to display a warning card regarding the interactive nature of the interactive feature.

17. The computer program product according to claim 10, further comprising:

computer readable program code configured to determine if a feature in the fastplay play list is on the multi-media disc; and computer readable program code configured to, responsive to determining that the feature is not on the multi-media disc, display a change disc prompt.

18. A system for dynamic content play list creation comprising:

one or more processors; and a memory operatively connected to the one or more processors;

wherein, responsive to execution of computer readable program code accessible to the one or more processors, the one or more processors are configured to:

dynamically generate a fastplay play list according to one or more customizable fastplay settings;

play media of a multi-media disc in a fastplay mode according to a default fastplay play list;

wherein the fastplay mode comprises an automated viewing mode in which a plurality of features of the multimedia disc are presented at standard playing speed and in linear order automatically on multi-media disc insertion and without user interaction;

provide a menu option for customizing one or more fastplay settings; and responsive to user input customizing the one or more fastplay settings, dynamically update the default fastplay play list according to the one or more customized fastplay settings;

the customized fastplay settings altering the predetermined linear order of multi-media disc content played automatically on multi-media disc insertion.

\* \* \* \* \*